Patented Apr. 20, 1943

2,317,286

UNITED STATES PATENT OFFICE 2,317,286

FURANE-DICARBOXYLIC-ACID-AMIDES AND THEIR MANUFACTURE

Henry Martin, Basel, Walter Baumann, Arlesheim, near Basel, and Hans Gysin, Basel, Switzerland, assignors to the firm J. R. Geigy A. G., Basel, Switzerland No Drawing. Application December 20, 1940, Serial No. 371,050. In Switzerland December 2, 1939

7 Claims. (Cl. 260—345)

It has surprisingly been found that the furane-dicarboxylic-acid-amides or furane-dicarboxylic-acid-ester-amides hitherto not known possess remarkable pharmacological properties which render them valuable for therapeutical uses. The said new compounds can be obtained by causing furane-dicarboxylic-acids or derivatives thereof, such as for example their metal salts, halides, esters or anhydrides, to react with secondary amines or their salts or with carbamic-acid-halides in the presence or absence of solvents, condensation agents and acid binding agents.

As condensation agents there may preferably be used phosphorus halides, phosphorus pentoxide, thionyl chloride as well as phosgene and so on.

The new compounds distinguish themselves especially by their excellent analeptical effects. The furane-dicarboxylic-acid-amides or furane-dicarboxylic-acid-ester-amides hitherto not known are in part very well soluble in water, in part soluble in alcohol, ether, chloroform, glycol-ether or propylene-glycol.

The invention is illustrated, but not limited, by the following examples, in which the parts are by weight, where nothing other is said.

Example 1

44 parts by weight of 2-methylfurane-5-acetic-acid-3-carboxylic-acid-dichloride (B. P. at 1.4 mm. 130° C.), made from the corresponding acid with thionyl-chloride, are dissolved in 500 parts by volume of absolute ether and a solution of 36 parts by weight of diethyl-amine in 400 parts by volume of absolute ether is, under stirring and cooling (at 0–10° C.), added drop by drop thereto. When all of the amine is dropped in, the temperature is allowed to raise up to room-temperature and the mixture is then warmed for still 2 hours up to 25° C. Thereupon the diethyl-amine-chlorhydrate separated out is sucked off in order to then treat the ethereal solution with a saturated potassium-carbonate solution. Thereupon there is dried over sodium sulfate. The ether having been expelled, the 2-methylfurane-5-acetic-3-carboxylic-acid-bis-diethyl-amide distils at 0.5 mm. and 185° C. as a weakly yellow colored oil. It is mixable in any proportion with water.

In the same manner the following compounds may be prepared:

2-methylfurane- 5 -acetic-3-carboxylic-acid-bis - dimethyl-amide. B. P. at 0.1 mm. 178° C., M. P. 80° C.

2-methylfurane- 5 -acetic-3-carboxylic-acid-bis - dipiperidide. M. P. 97° C.

2-methylfurane- 5 -acetic-3-carboxylic-acid-bis - N-methylanilide. M. P. 124° C.

2-methylfurane- 5 -acetic-3-carboxylic-acid-bis - diallylamide. B. P. at $10^{-4}$ mm. 140° C.

2-methylfurane- 5 -acetic-3-carboxylic-acid-bis - dipropylamide. B. P. at $10^{-4}$ mm. 140–145° C.

2-methylfurane- 5 -acetic-3-carboxylic-acid-bis - morpholide. B. P. at 0.07 mm. 140–150° C.; M. P. 158–160° C.

2-methylfurane- 5 -acetic-3-carboxylic-acid-bis - ethylallylamide.

2-methylfurane- 5 -acetic-3-carboxylic-acid-bis - αα-dimethylpiperidide.

2-methylfurane- 5 -acetic-3-carboxylic-acid-bis - α-methylpiperidide.

2-methylfurane- 5 -acetic-3-carboxylic-acid-bis - N-methylbenzylamide.

Instead of 2 molecules of the organic base there may also be used only one molecule thereof and the acid becoming free be bound by a carbonate such as anhydrous sodium carbonate.

Example 2

22 parts of 2-methylfurane-5-acetic-3-carboxylic-acid-dichloride or the equivalent quantity of the corresponding dibromide are heated with 20 parts of diethylamine-chlorhydrate during 2 hours up to about 160° C. The obtained melt is dissolved in water, then a caustic alkali is added thereto and the whole is shaken out with ether. The ethereal solution is dried, concentrated by evaporation and purified by distillation. The same bis-diethylamide as that of Example 1 is obtained.

Instead of the hydrochloride another salt can also be used.

Example 3

15 parts of the disodium salt of the 4-methyl-furane-2-acetic-3-carboxylic acid (or of another salt such as of the potassium salt) are heated up to about 150° C. with 40 parts of diethylcarbamic-acid-chloride. Under development of carbonic acid a stormy reaction to the bis-diethylamide of the 4-methylfurane - 2 - acetic - 3 - carboxylic acid takes place. The same is dissolved in ether and washed with water; after drying and evaporating the solvent, the bis-diethylamide is obtained in form of a nearly colorless liquid boiling at 158–160° C. (at 0.65 mm.).

Instead of the diethylcarbamic-acid-chloride the corresponding quantity of the dimethyl compound may also be used.

In the same manner as the 4-methylfurane-2-acetic-3-carboxylic acid the furane-2-acetic-3-carboxylic acid, the 4-ethylfurane-2-acetic-3-carboxylic acid or the 4:5-dimethylfurane-2-acetic-3-carboxylic acid can also be converted into the bis-diethylamide. The reaction takes place in the same manner if, instead of the sodium salt, other salts such as for instance calcium salts, are used.

*Example 4*

20 parts by weight of 2-methylfurane-5-acetic-acid-ethylester-3-carboxylic - acid - chloride, B. P. at 12 mm. 145–147° C., prepared from 2-methylfurane-5-acetic-acid-ethylester - 3 - carboxylic acid and thionyl chloride, are dissolved in ether, then mixed with the calculated quantity of diethylamine and the whole is kept for 2 hours at 25° C. After filtration of separated diethylamine-chlorhydrate the ethereal solution is washed with water, then dried and afterwards the ether is expelled. The residue, the 2-methylfurane-5-acetic-acid-ethylester - 3 - carboxylic-acid-diethylamide, forms a bright oil with a boiling point of 160–162° C. at 1 mm. pressure.

*Example 5*

18 parts of 2:5-dimethylfurane-3:4-dicarboxylic-acid-chloride, B. P. at 14 mm. 135–137° C., made from 2:5-dimethylfurane-3:4-dicarboxylic acid and thionyl chloride, are dissolved in absolute ether and mixed with 24 parts of diethylamine. Diethylamine-chlorhydrate is at once separated out. After a standing for two hours the said chlorhydrate is sucked off, the ether is washed with a saturated potassium carbonate solution, then dried with potassium hydroxide and evaporated. The residue, the 2:5-dimethylfurane-3:4-dicarboxylic - acid - bis - diethylamide, boils at 154–156° C., and 0.4 mm. pressure. Crystallised from petroleum ether it forms great transparent crystals of a melting point of 62° C. It is clearly soluble in water.

Instead of the chloride the anhydride can also be used.

*Example 6*

8 parts of 2:4-furanedicarboxylic-acid-chloride, made from 2:4-furanedicarboxylic-acid and thionylchloride, are dissolved in absolute benzene and mixed with the calculated quantity of diethylamine. The mixture is heated during several hours up to 40° C. and after some standing the chlorhydrate separated out is filtered off. The benzene solution is treated with a concentrated caustic alkali and then dried with solid potassium hydroxide. After the evaporation of the benzene the 2:4-furane-dicarboxylic-acid-bis-diethylamide remains as a water-soluble substance.

In the same manner the 2:5-furane-dicarboxylic-acid-bis-diethylamide may be produced.

*Example 7*

20 parts of 2-methylfurane-5-acetic-3-carboxylic-acid-diphenylester, made by heating 2-methylfurane-5-acetic-3 - carboxylic - acid - dichloride and phenol in a benzene solution, are heated in the tube for several hours up to 160° C. with 50 parts of diethylamine. From the reaction mixture there results, as in Example 1, methronic-acid-bis-diethylamide.

*Example 8*

20 parts of 2-methylfurane-5-acetic-3-carboxylic-acid are transformed into the diethylamine salt and heated up to about 150° C. under addition of 25 parts of phosphorus oxychloride. The transformation being finished, the resulting product is worked up as described in Example 1. Thus methronic-acid-bis-diethyl-amide is obtained.

Instead of phosphorus oxychloride one may also use phosphorus pentoxide.

What we claim is:

1. The amides of furane-dicarboxylic acids of the following general formula

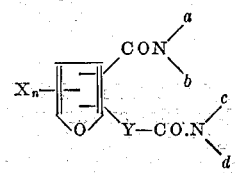

wherein X means a member of the group consisting of H and alkyl, Y means a member of the group consisting of $CH_2$ and the direct linkage, $n$ being one to two, and $a, b, c, d$ mean monovalent radicals selected from the group consisting of alkyl, cycloalkyl and aryl radicals of the benzene series, and the couples $a\,b$ and $c\,d$ mean divalent aliphatic radicals, prepared for use as therapeutics.

2. The amides of furane-dicarboxylic-acids of the following general formula

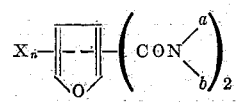

wherein X means a member of the group consisting of H and alkyl, $n$ being one to two, and $a, b$ mean monovalent radicals selected from the group consisting of alkyl, cycloalkyl and aryl radicals of the benzene series, and the couple $a\,b$ means divalent aliphatic radicals, prepared for use as therapeutics.

3. The diethylamides of furane-dicarboxylic-acids of the following general formula

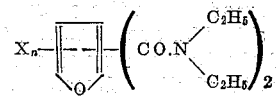

wherein X means a member of the group consisting of H and alkyl, $n$ being one to two, prepared for use as therapeutics.

4. The diethylamides of furane-dicarboxylic-acids of the following general formula

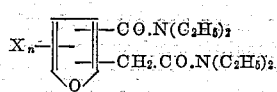

wherein X means a member of the group consisting of H and alkyl, and $n$ being one to two, the said diethylamides prepared for use as a therapeutic.

5. The 2-methylfurane-5-acetic-3-carboxylic-acid-bis-diethylamide of the following formula

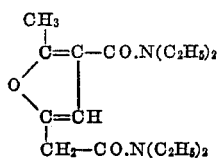

prepared for use as a therapeutic.

6. The 2.5-dimethylfurane-3.4-dicarboxylic-acid-bis-diethylamide of the following formula

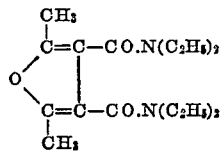

prepared for use as a therapeutic.

7. The furane-2-acetic-3-carboxylic-acid-bis-diethylamide of the following formula

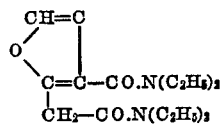

prepared for use as a therapeutic.

HENRY MARTIN.
WALTER BAUMANN.
HANS GYSIN.